(12) United States Patent
Verhaeghe

(10) Patent No.: US 6,739,447 B2
(45) Date of Patent: May 25, 2004

(54) MULTI-CELL RECIPROCATING CONVEYOR SLAT AND METHOD OF MANUFACTURE AND NON-CONTINUOUS GUIDE STRUCTURE

(76) Inventor: Jan Josef Verhaeghe, Stuurstraat 113B, B-9120, Haasdonk (BE)

( * ) Notice: Subject to any disclaimer, the term of this patent is extended or adjusted under 35 U.S.C. 154(b) by 0 days.

(21) Appl. No.: 10/229,292

(22) Filed: Aug. 28, 2002

(65) Prior Publication Data

US 2003/0168318 A1 Sep. 11, 2003

Related U.S. Application Data

(60) Provisional application No. 60/631,702, filed on Mar. 6, 2002.

(51) Int. Cl.⁷ .............................................. B65G 25/04
(52) U.S. Cl. .................................................. 198/750.1
(58) Field of Search ........................... 198/750.1, 750.2, 198/750.3

(56) References Cited

U.S. PATENT DOCUMENTS 4,679,686 A * 7/1987 Foster ..................... 414/525.1
5,447,222 A * 9/1995 Foster ..................... 198/750.2
5,560,472 A * 10/1996 Gist ........................ 198/750.3
5,638,943 A * 6/1997 Foster ..................... 198/750.5
5,727,672 A * 3/1998 Foster ..................... 198/750.2
6,013,585 A * 1/2000 Foster et al. ................. 442/43
6,019,215 A * 2/2000 Foster ..................... 198/750.3
6,257,396 B1 * 7/2001 Quaeck ................... 198/750.3

* cited by examiner

Primary Examiner—Richard Ridley
(74) Attorney, Agent, or Firm—McDermott, Will & Emery

(57) ABSTRACT

A pultruded slat for a reciprocating slat conveyor system comprises a slat body including a top portion, a first side portion, and a second side portion, the first and second side portions depending downwardly from opposite lengthwise sides of the top portion; wherein the first side portion and second side portion each include projections extending toward an opposing side portion, wherein the top portion of the slat body comprises a plurality of closed cells, and wherein a bottom of the top portion, the first side portion, the second side portion, and the projections comprise an open cell.

19 Claims, 12 Drawing Sheets

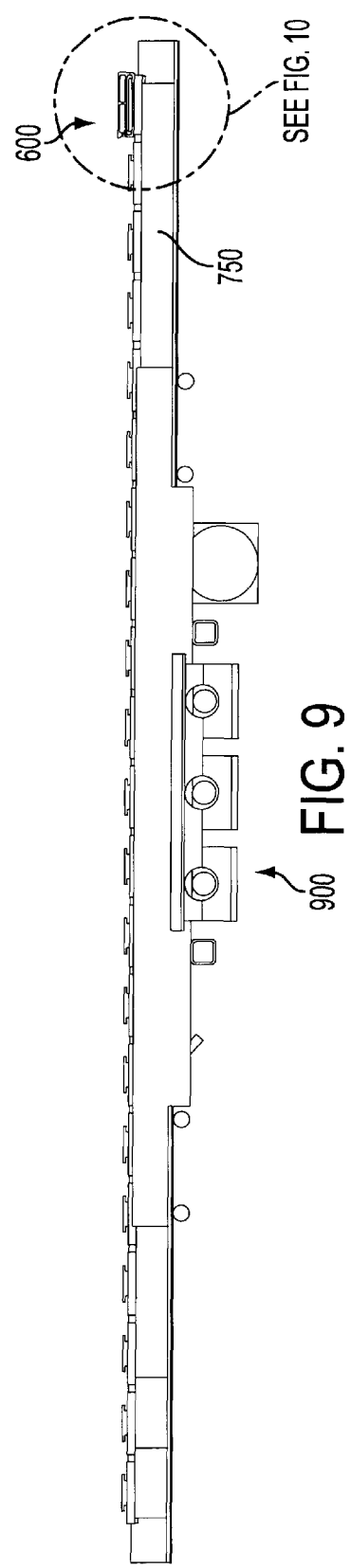

MULTI-CELL RECIPROCATING CONVEYOR SLAT AND METHOD OF MANUFACTURE AND NON-CONTINUOUS GUIDE STRUCTURE

CROSS-REFERENCE TO RELATED APPLICATIONS

This application claims priority to United States provisional application serial No. 60/631,702, filed Mar. 6, 2002.

FIELD OF INVENTION

The invention relates to a reciprocating floor assembly, wherein the floor comprises adjacent reciprocating slats that can be moved relative to one another in such a manner as to move a load or object disposed on the floor.

BACKGROUND OF THE INVENTION

Reciprocating floor assemblies are particularly valued in the trucking, waste hauling, and shipping industries, where such reciprocating floors are used to load and unload cargo or transported commodities to assist personnel performing the loading or unloading operations or even to entirely obviate the need for such assistance in operations such as dumping transported waste. To accomplish this feat, conventional reciprocating slat conveyors include at least three groups of slats, which can be separately shifted relative to one another and driven in succession in one direction by means of a suitable driving means over a predetermined stroke length. In a returning stroke, the slats are withdrawn non-uniformly to an initial starting position to repeat the cycle, each cycle incrementally advancing the load in a desired direction. Such reciprocating floor assemblies are shown in, for example, EP 0 721 901 A1 issued to Cargo Handling Systems B.V., incorporated herein by reference, and U.S. Pat. No. 5,638,943 issued to Foster. Conventional slats for such systems are taught in, for example, U.S. Pat. Nos. 5,447,222, 6,013,585, and 6,019,215 issued to Raymond K. Foster. These patents disclose, as shown in FIG. 1 of this application, a conveyor slat 10 having an upper portion and laterally spaced apart depending leg portions 24, 26, each with a laterally outwardly directed flange 28, 30. These conveyor slats are provided on guide beams 12 having narrow mounting portions and wider upper portions. Inwardly directed flanges are disposed at the bottom of depending legs 24, 26 in a position corresponding to the narrowed portion of the guide beams.

In conventional reciprocating floor systems, such as provided in U.S. Pat. No. 5,638,943, the longitudinal guide beams 155 which help guide and align corresponding floor slat members during reciprocating movement rest on and are secured to ribs 126, 128, 130 of the mounting frame members 116, 118, as shown in FIGS. 2 and 3. U.S. Pat. No. 4,679,686, also issued to Foster, shows guide beams 12 extending across upper surface of transverse I-beams 14, as shown in FIG. 4 herein. This configuration is also taught by U.S. Pat. No. 6,257,396 issued to Quaeck, which shows in attached FIG. 5 that the beams 12, 13 having bearing strips 14, 15 are disposed to traverse cross beams 10, 11.

A need exists for continued improvements in load distribution and weight minimization of such structures.

SUMMARY OF INVENTION

It is accordingly one object of the present invention to provide improved pultruded slats for such conveyor systems.

A further object of the invention is to provide a reciprocating slat conveyor system which includes the pultruded slots of the inventor.

Other objects and advantages of the invention will become apparent as the description proceeds.

In satisfaction of the foregoing objects and advantages, the present invention provides a slat for a reciprocating slat conveyor system comprising:

a slat body including a top portion, a first side portion, and a second side portion, the first and second side portions depending downwardly from opposite lengthwise sides of said top portion;

wherein the first side portion and second side portion each include projections extending toward an opposing side portion, wherein the top portion of the slat body comprises a plurality of closed cells, and wherein a bottom of the top portion, the first side portion, said second side portion, and the projections comprise an open cell.

In a further embodiment, the invention provides a continuous profile molding method for manufacturing a slat for a reciprocating slat conveyor system comprising the steps of:

arranging a plurality of fibers into a shape of at least a top portion of a lengthwise slat body, the slat body comprising a top portion, a first side portion, and a second side portion, the first and second side portions depending downwardly from opposite lengthwise sides of the top portion; wherein the first side portion and second side portion each include projections extending toward an opposing side portion, wherein the top portion of the slat body comprises a plurality of closed cells, wherein a bottom of the top portion, the first side portion, the second side portion, and the projections comprise an open cell;

applying a thermoplastic or thermosetting resin onto said fibers; and moving the fibers bearing the thermosetting resin through a die, wherein the fibers bearing the thermoplastic or thermosetting resin are heated to a temperature sufficient to melt the resin and are compressed to form the slat body.

Also provided is a reciprocating slat conveyor system having a plurality of adjacent conveyor slats mounted to be selectively reciprocated endwise, comprising:

a plurality of elongated slat bodies extending in and reciprocatingly moving in a first direction, the elongated slat bodies including a top portion, a first side portion, and a second side portion, the first and second side portions depending downwardly from opposite lengthwise sides of the top portion, wherein the first side portion and second side portion each include projections extending toward an opposing side portion, wherein the top portion of the slat body comprises a plurality of closed cells, and wherein a bottom of the top portions, the first side portion the second side portion, and the projections comprise an open cell; and a plurality of guide blocks mounted to a top surface of cross members extending in a second direction perpendicular to said first direction.

BRIEF DESCRIPTION OF THE DRAWINGS

Reference is now mode to the drawings accompanying the application wherein:

FIG. 9 shows a cross-sectional view of a trailer-based reciprocating conveyor system utilizing the multi-cell reciprocating conveyor slats and non-continuous guide structures in accord with the invention;

DESCRIPTION OF THE INVENTION

Figure 1:
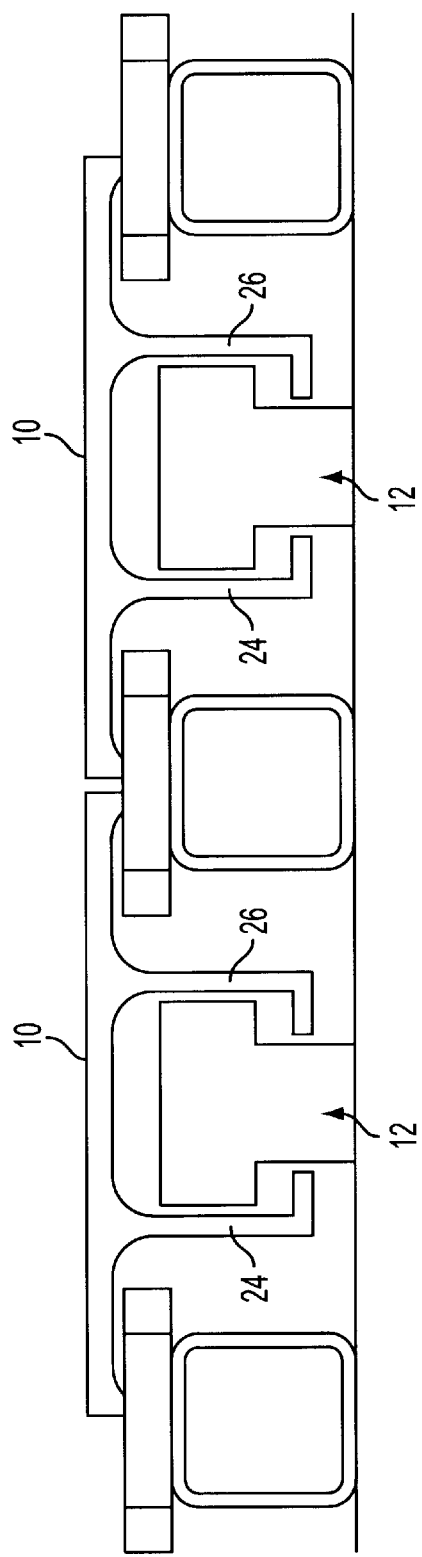
FIG. 1 shows a cross-sectional view of a conventional reciprocating conveyor slat of the prior art.
Figure 2:
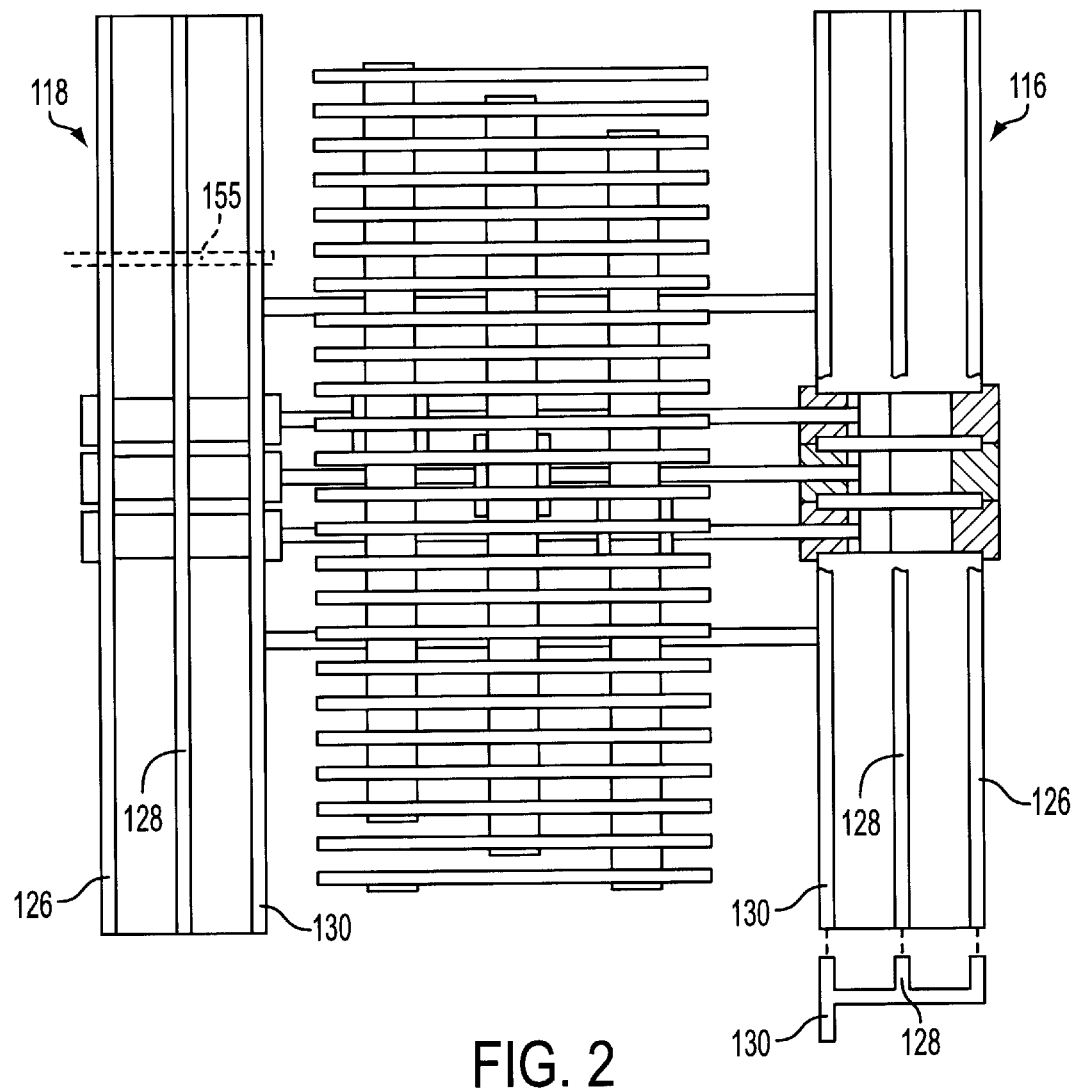
FIG. 2 shows a top-view of a conventional reciprocating conveyor slat continuous guide structure.
Figure 3:
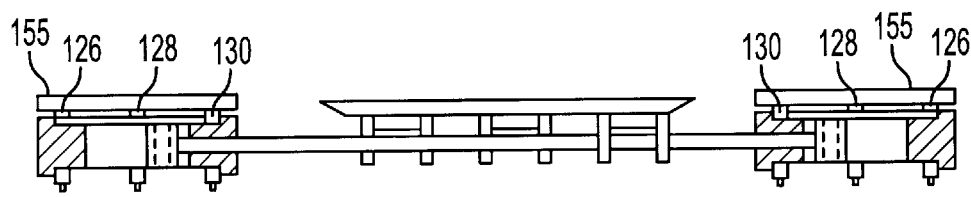
FIG. 3 shows a cross-sectional view of the conventional reciprocating conveyor slat continuous guide structure of FIG. 2.
Figure 4:
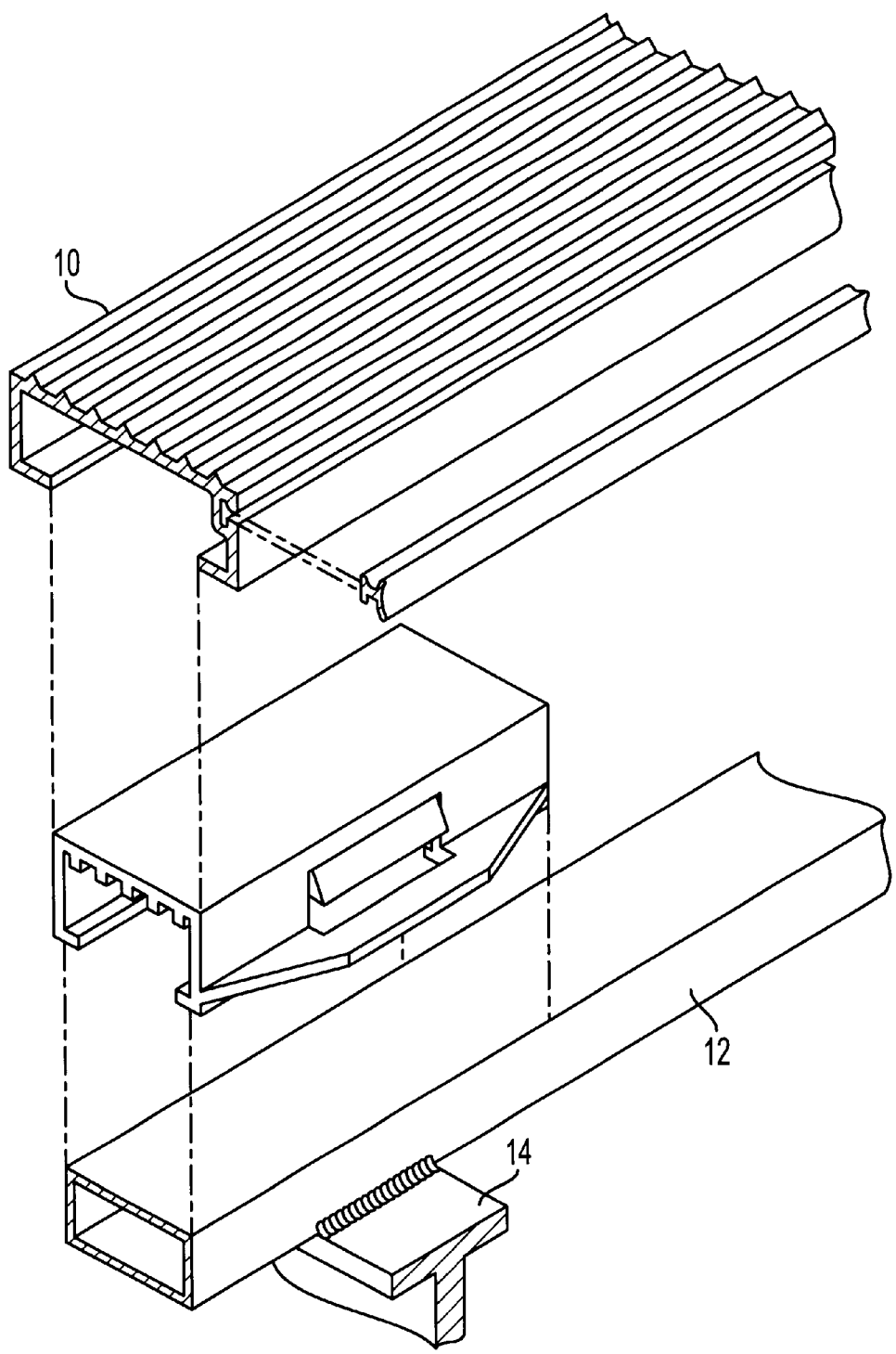
FIG. 4 shows an isometric view of a conventional reciprocating conveyor slat continuous guide structure and slat.
Figure 5:
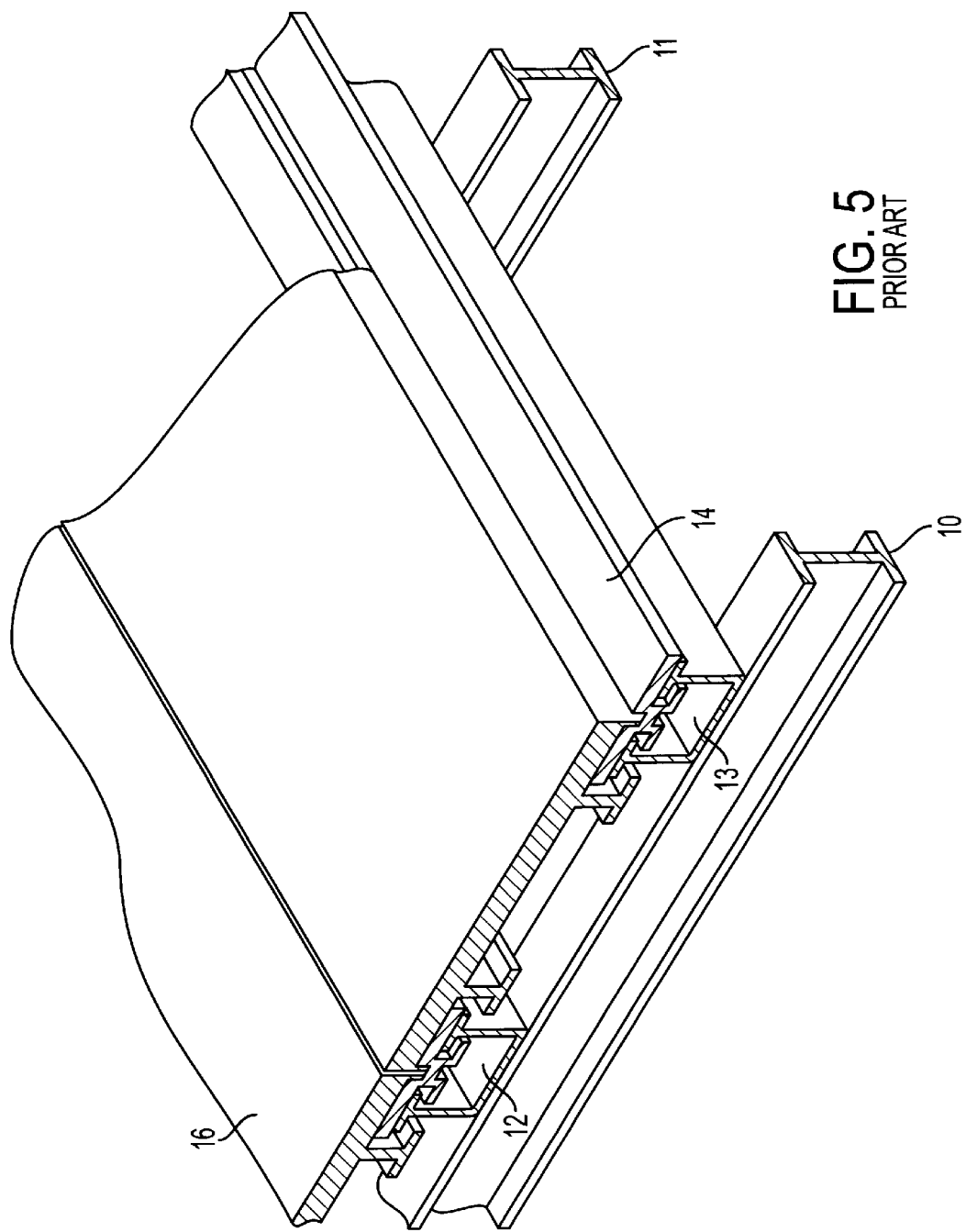
FIG. 5 shows another isometric view of a conventional reciprocating conveyor slat continuous guide structure and slat.
Figure 6:
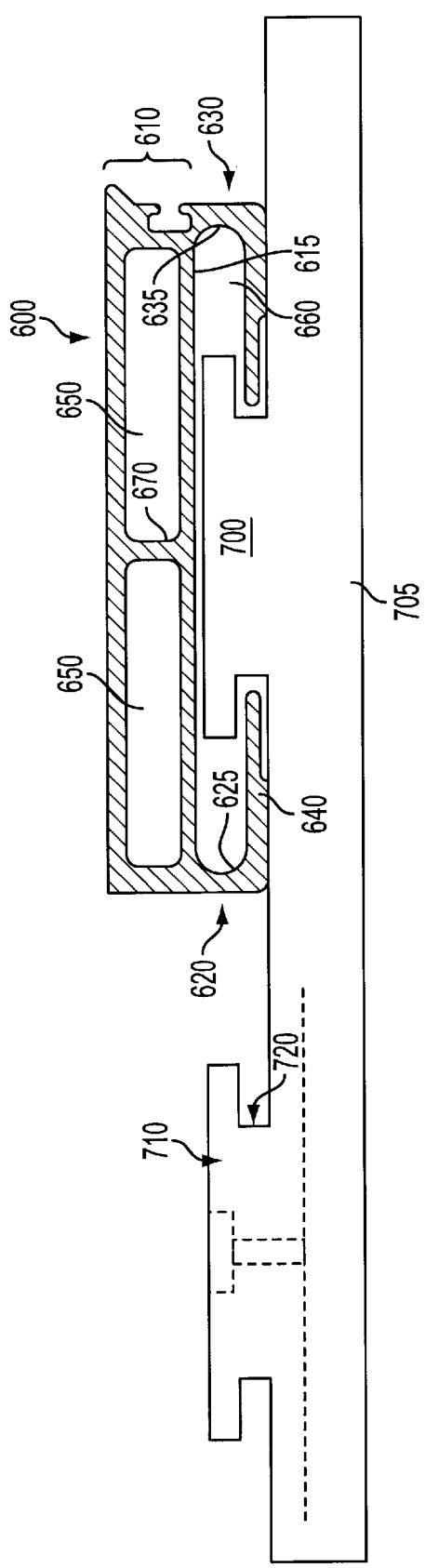
FIG. 6 shows a cross-sectional view of a multi-cell reciprocating conveyor slat and non-continuous guide structure in accord with the invention.
Figure 7:
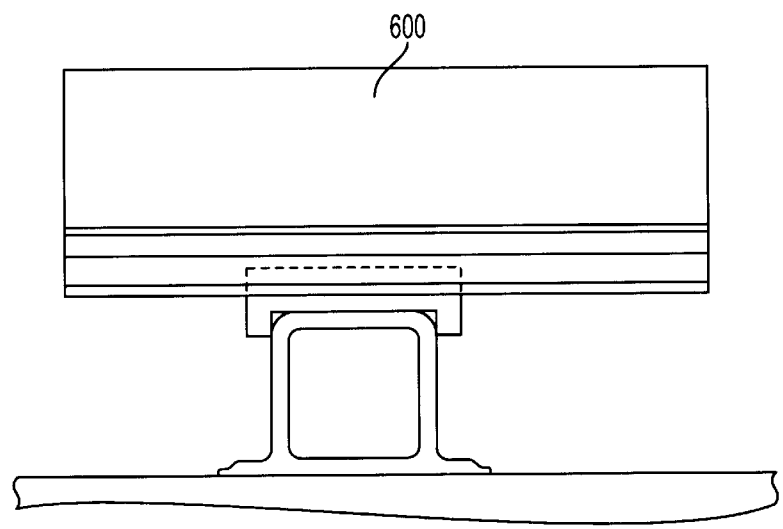
FIG. 7 shows a side-view of a multi-cell reciprocating conveyor slat and guide non-continuous structure in accord with the invention.
Figure 8A:
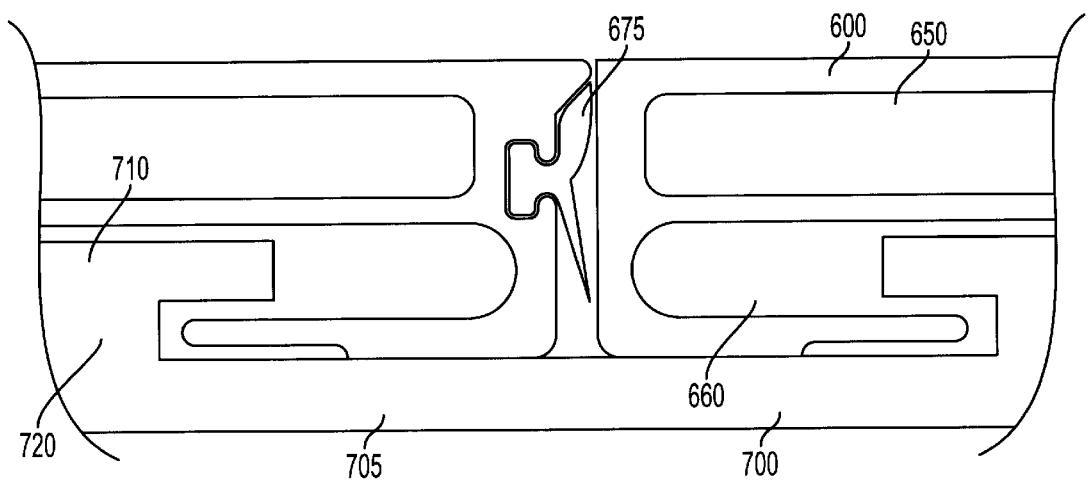
FIGS. 8a and 8b show another cross-sectional view of a multi-cell reciprocating conveyor slat, slat seal, and non-continuous guide structure in accord with the invention and an enlarged view of a portion thereof.
Figure 8B:
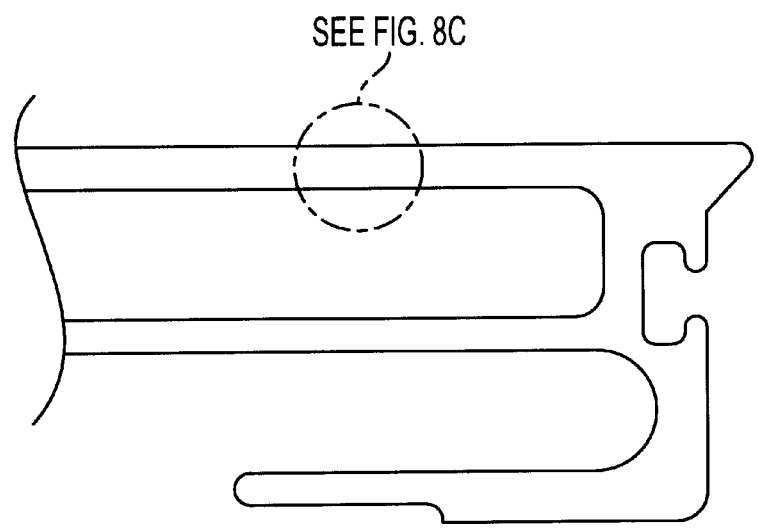
Figure 8C:
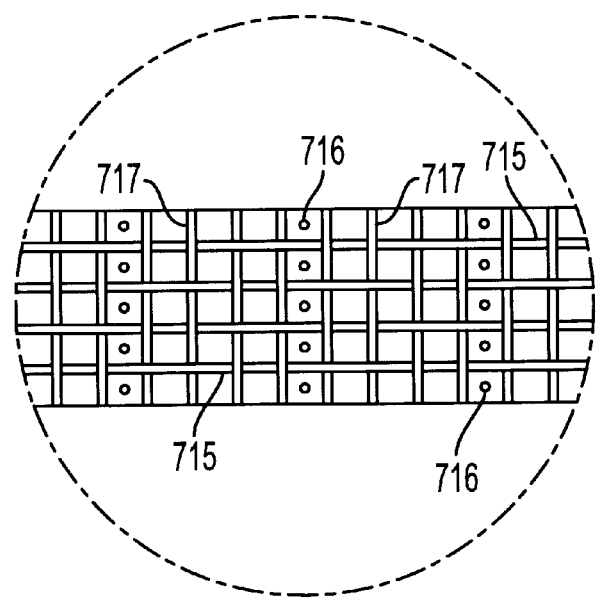

FIGS. 6–8 show a slat 600 for a reciprocating slat conveyor system. Slat 600 has an elongated slat body extending in a direction perpendicular to the plane of the Figure, including a top portion 610, a first side portion 620 and a second side portion 630, each depending downwardly from opposite lengthwise sides of top portion 610. First and second side portions 620, 630 each include projections 640 extending toward an opposing side portion. The top portion 610 of slat 600 comprises, in accord with the invention, a plurality of closed cells 650. A bottom 615 of top portion 610 and inner sides 625, 635 of the first and second side portions 620, 630, respectively, define an open cell 660. A seal 675 may be provided between adjacent slats on one or even both sides of the slat 600. Various configurations of seals are known in the art and any are suitable for use in combination with the slat 600 of the invention.

As illustrated in FIGS. 6 and 8, slat 600 top portion 610 comprises two closed cells 650 extending along at least substantially an entire length of the slat, although the closed cells 650 may be formed so as to extend along only a portion of slat 600. Instead of continuous closed cells 650 traversing a length, or substantially all of a length, of slat 600, the closed cells 650 may be distributed, uniformly or otherwise, across a length of the slat 600. In various configurations contemplated by the present invention, the closed cells 650 may comprise multiple tiers, such as one upper closed cell 650 extending across the slat on an upper part of top portion 610 and two other closed cells 650 disposed beneath the upper closed cell or the reverse.

It is generally preferred that the closed cells 650 collectively comprise at least half of an interior volume of the slat 600 top portion 610. However, this relationship is not mandatory and the volume of the closed cells 650 may comprise anywhere from about 2% to 95% of the volume of the slat 600 top portion, as determined by the slat top portion outer dimensions. The actual volume of the closed cells 650 depends, in part, upon the material of the slat 600 and distribution and structure of reinforcing means, if any, and could even occur above or below the above ranges with suitable selection of materials, arrangement of supporting structures, and intended application, such as light duty applications. In one aspect, the closed cells 650 may be pressurized, wherein the degree of allowable pressurization depends on the both the material of slat 600, method of forming slat 600, and distribution and structure of reinforcing means, if any. Excess pressurization, if any, is generally below 5 psi, but can be larger or smaller in accord with the above design parameters. Further, the closed cells may be wholly or partially filled with a material, such as but not limited to foam (e.g., polyurethane foam), balsa wood, insulation, or thermoplastic materials, to provide desired structural properties (e.g., static rigidity or stiffness) and material properties (e.g., dynamic rigidity or vibration reduction).

The guide member or glider block 700 illustrated in FIGS. 6–8a includes a base portion 705, a head portion 710 and a neck portion 720, wherein the head portion 710 possesses a greater lateral dimension than the neck portion 720. The head portion 710 is configured for insertion into the open cell 660. The neck portion 720 is configured to pass between the opposing projections 640. The glider block 700 must possess a relatively low coefficient of friction (e.g., below about 0.3) relative to the slat 600 so as to minimize parasitic losses. In one preferred aspect, both the glider block and the slat are formed from polypropylene having a coefficient of friction between about 0.10 and 0.30. Other materials may be used, such as but not limited to polyethylene, Ultra High Molecular Weight Polyethylene (UHMWPE), polyolefins, or acetal resin.

The conveyor slats 600 and/or glider block 700 may be provided with reinforcing members. In one aspect of the invention, the slat 600 reinforcing members include ribs 670 disposed between adjacent closed cells 650. The reinforcing members may also comprise longitudinal or x-axis reinforcing fibers 715, lateral or y-axis reinforcement fibers 716 and/or z-axis reinforcing fibers 717, which could comprise individual fibers and/or stitched fibers in a continuous or discontinuous z-stitch fibers along the longitudinal or lateral axis. An example of such reinforcements, used in combination, is shown in the exploded partial view of FIG. 8b, wherein a magnified section of the floor slat 600 is shown to possess x-axis reinforcing fibers 715, y-axis reinforcing fibers 716, and z-axis reinforcing z-stitch fiber 717 extending alone the y-axis. The floor slat 600 may accordingly comprise glass fibers (unidirectional/mat/stitched) in thermoset resin to form a single matrix. In another aspect of the invention, the slat 600 is formed using a pre-mix of continuous glass and thermoplastic fibers/fabrics in a resin, which would be pulled through at least one of a heated and/or chilled die. In the die(s), the impregnated fabric would be melted and molded into a hard, cured shape, as the glass the thermoplastic weld or polymerize together. This process is in contrast to the conventional process of using a glass or thermoplastic fabric, passing it through a resin bath or resin injection, usually with a reacting medium, and then through a heated die (and/or chilled die) resulting to produce cured shape.

Figure 10:
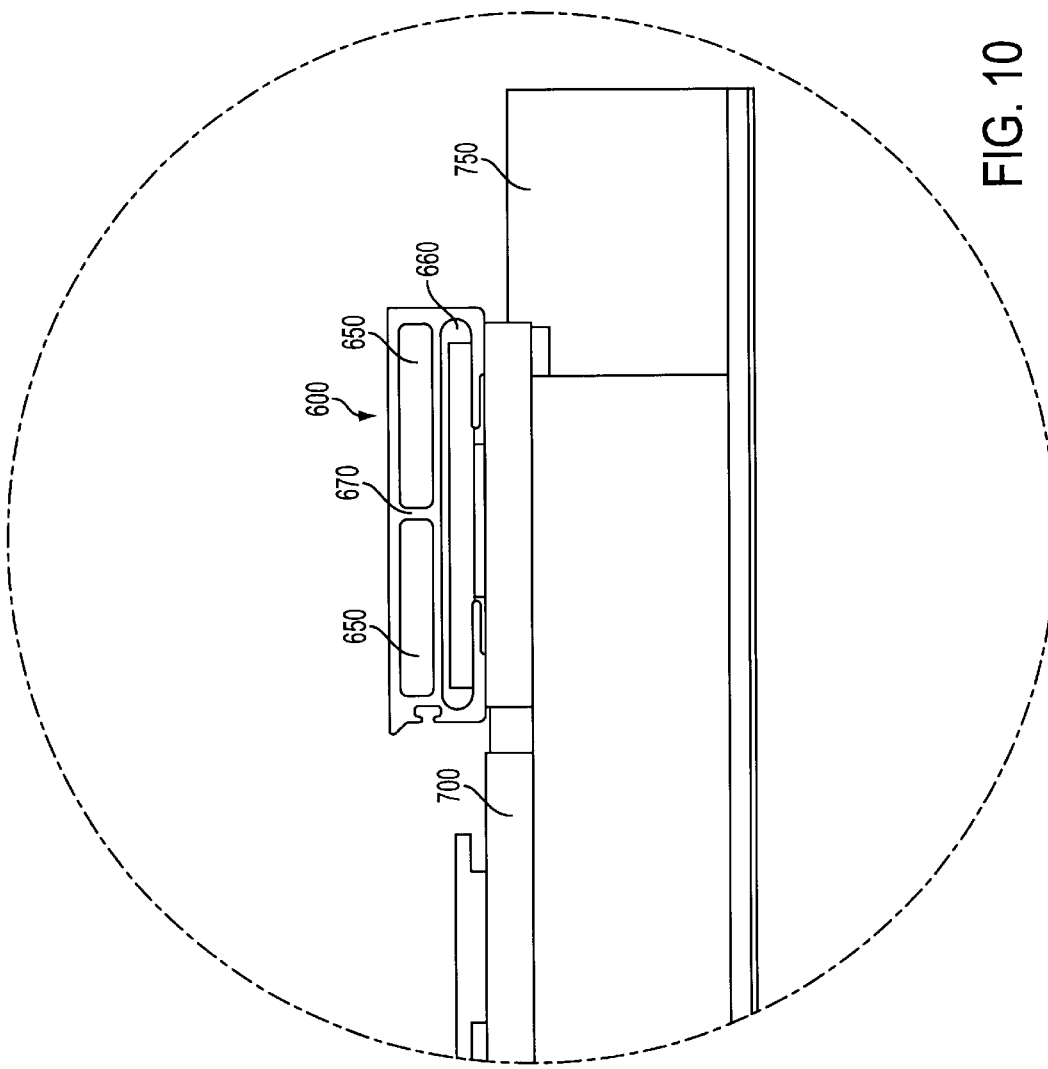
FIG. 10 shows a magnified view of the multi-cell reciprocating conveyor slats and non-continuous guide structures of FIG. 9.

The glider block 700 of the present invention eliminates the continuous blocks and channels of conventional reciprocating conveyor arrangements in favor of discontinuous guide block or glider block 700 mounted along cross members 750 disposed, in turn, upon chassis beam 760. Glider blocks 700 extend from one side of the cross member 750 to the opposite side thereof and are attached to a top surface thereof by a suitable attachment means, such as but not limited to welding, frictional engagement, adhesives or epoxies, and mechanical fasteners such as screws, bolts, rivets, and clamps. The conveyor slats 600 are intermittently supported by the guide block 700 base portions 705, as depicted in FIGS. 6, 8a, and 10, but are otherwise unsupported between cross members 750, such as shown in FIG. 7, thereby providing a meaningful weight reduction without unduly compromising structural support of the slats and associated loads.

Slats 600 may be formed by pultrusion, a conventionally known process practiced in various forms for decades. The above noted slats may be formed by a continuous profile extrusion process, wherein one or more extruders, known to those skilled in the art, containing one or more resins and/or additives or thermoplastics are used to force a molten resin through a die the shape of the required cross-section. As the material leaves the die, the material is cooled and the extrusion is cut into slats when sufficiently cooled. Polyethylene and polypropylene are commonly used resins suitable for use in the slats. Injection molding, wherein a thermoplastic or thermoset compound is heated to plasticity at a controlled temperature and then forced under pressure through a nozzle into sprues, runners, gates, and/or cavities of a mold, wherein the resin undergoes rapid solidification, may also be used. The mold is then opened and the finished slat ejected.

One exemplary process by which the slats 600 of the invention may be formed include DOW Plastic's FULCRUM™ technology, based on ISOPLAST, an engineering thermoplastic polyurethane, and a new pultrusion process, wherein reversal of the polymerization process in the melt stage yields equivalent mechanical properties similar to thermoset composites and enhances toughness and damage tolerance while simultaneously permitting processing of profiles at very high speeds, as known to those skilled in the art (FULCRUM is a trademark of The Dow Chemical Co.). Other variations on the pultrusion, expultrusion, extrusion, co-extrusion, and similar forming processes are considered applicable to the present invention.

In one aspect, the glider block 700 may be formed, such as by extruded polyethylene, in consistent profile and then machined to remove material to form the glider blocks 700 depicted in FIGS. 6–8a, wherein the glider blocks 700 are spaced at intervals corresponding to desired positions of the floor slats 600. In a preferred aspect of the invention, one glider block 700 is disposed along the top of each cross-member 750 and each glider block is substantially the width of the corresponding cross-member.

FIG. 9 shows a cross-sectional view of a trailer-based reciprocating conveyor system utilizing the multi-cell reciprocating conveyor slats 600 and guide structures 700 in accord with the invention. FIG. 10 provides a magnified view of one section of FIG. 9, showing in more detail the multi-cell reciprocating conveyor slat 600 and guide structure 700.

Figure 11:
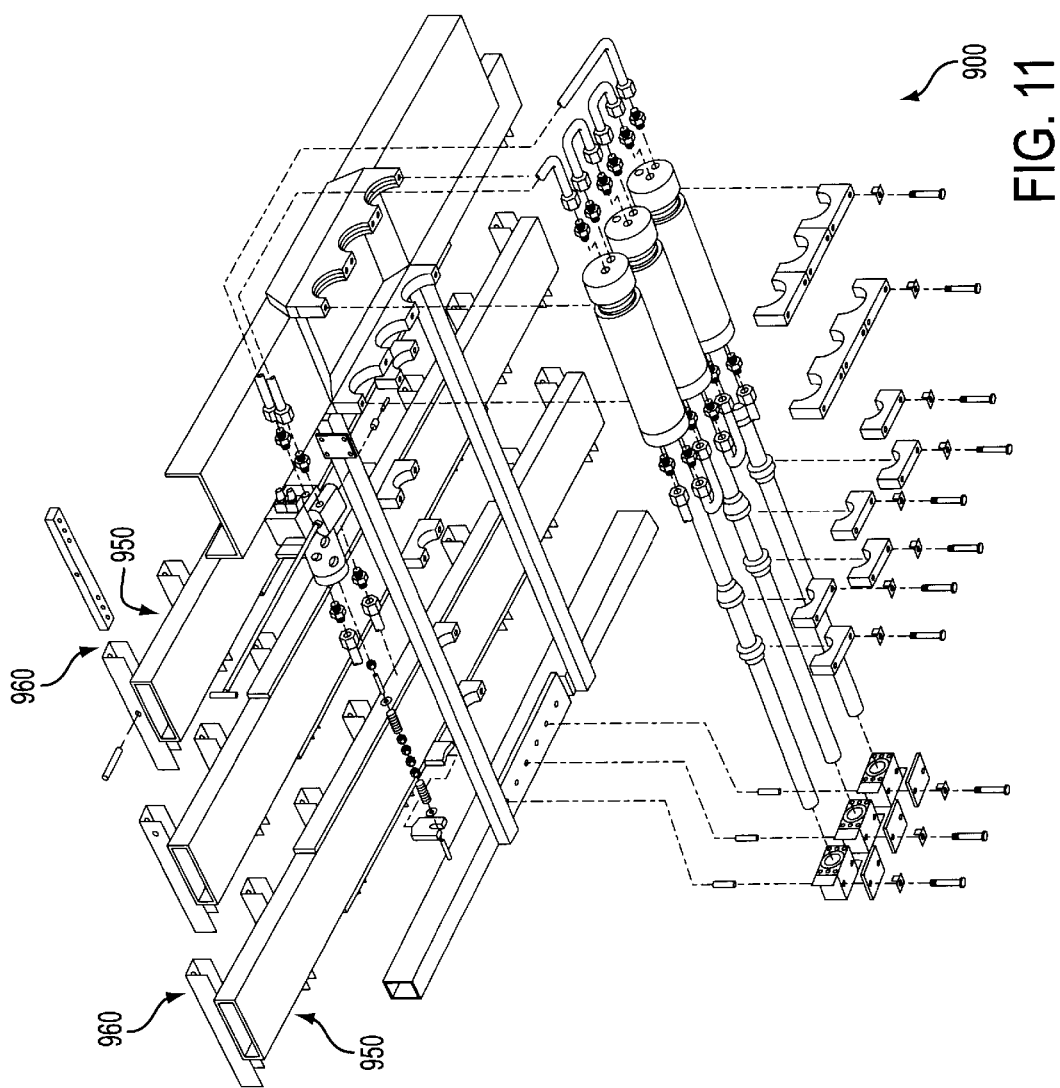
FIG. 11 shows an isometric view of a drive system implementable with the invention.
Figure 12:
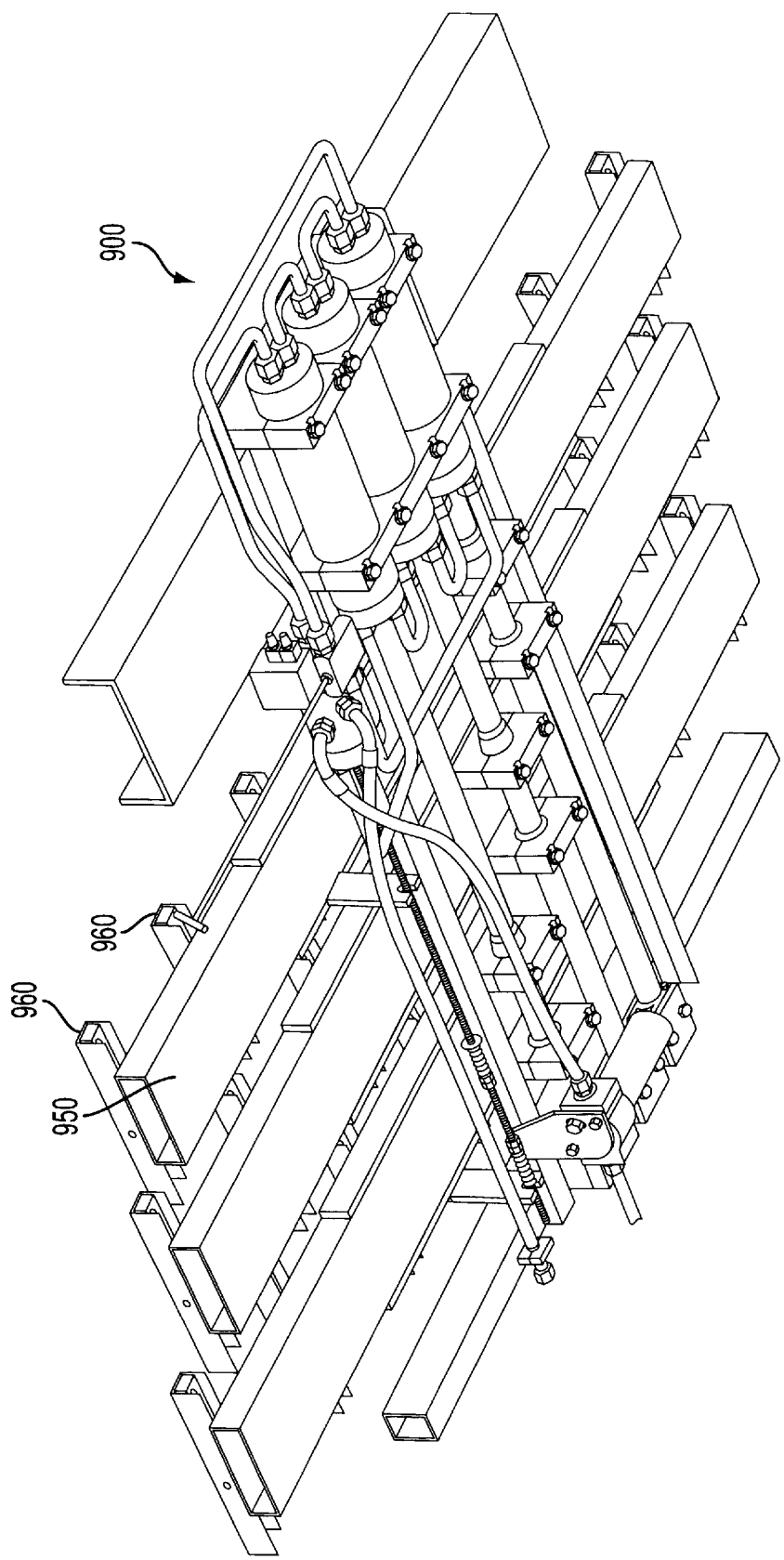
FIG. 12 shows an assembled view of a drive system of FIG. 10 implementable with the invention.

FIGS. 11 and 12 illustrate an embodiment of a drive system 900 advantageously used in accord with the invention. Other conventional drive systems may also advantageously be used in combination with the inventive slat and glider block of the present invention.

Figure 13:
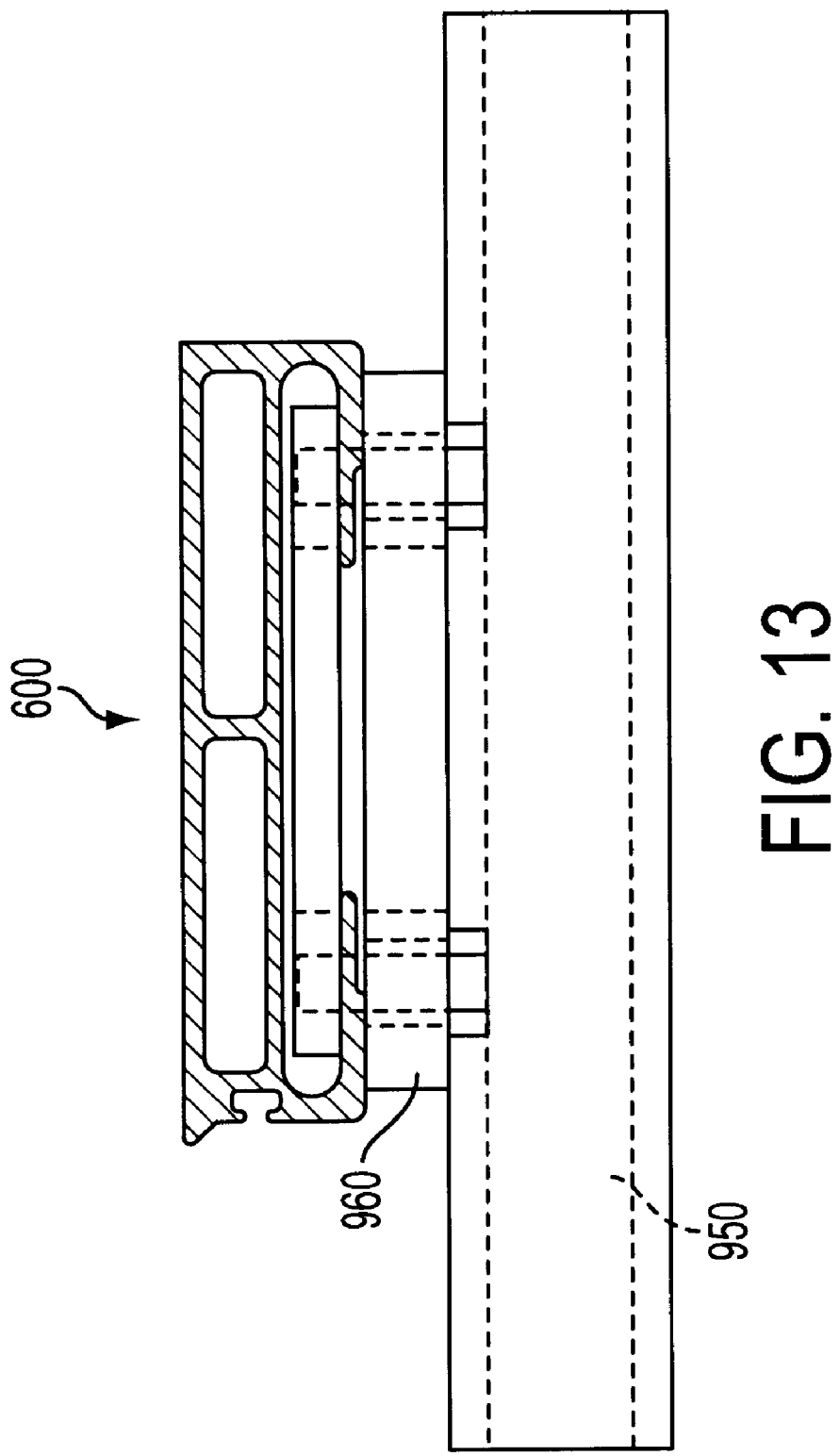
FIG. 13 shows one aspect of the attachment of the components of the reciprocating floor system in accord with the invention.

FIG. 13 shows one aspect of the attachment of the of components of the reciprocating floor system including the attachment of slat 600 to a footplate 960, which in turn is attached to a tube 950 of the hydraulic unit which moves the slats.

The drive system, as well as other aspects of reciprocating conveyor systems considered applicable to the invention, are generally described in the European Patent Application EP 0 721 901 A1, published Jul. 17, 1996, applied for by Cargo Handling Systems, B.V., which is incorporated herein by reference in its entirety.

In accord with the above inventive reciprocating slat conveyor system components and system, an improved load distribution and a reduction in parts and weight is realized over the conventional reciprocating slat conveyor systems.

What is claimed:

1. A slat for a reciprocating slat conveyor system comprising:

a slat body including a top portion, a first side portion, and a second side portion, said first and second side portions depending downwardly from opposite lengthwise sides of said top portion;

wherein said first side portion and second side portion each include projections extending toward an opposing side portion, wherein said top portion of said slat body comprises a plurality of closed cells spaced apart along a width of said top portion, wherein said plurality of closed cells are at least substantially hollow;

wherein a bottom of said top portion, said first side portion, said second side portion, and said projections comprise an open cell.

2. A slat for a reciprocating slat conveyor system according to claim 1, wherein said top portion of said slat body comprises two closed cells extending along at least substantially an entire length of said slat.

3. A slat for a reciprocating slat conveyor system according to claim 1, wherein said top portion of said slat body comprises two closed cells extending along a portion of said slat.

4. A slat for a reciprocating slat conveyor system according to claim 1, wherein said top portion of said slat body comprises a plurality of closed cells dispersed along a length of said slat.

5. A slat for a reciprocating slat conveyor system according to claim 1, wherein said top portion of said slat body comprises a plurality of closed cells evenly dispersed along a length of said slat.

6. A slat for a reciprocating slat conveyor system according to claim 1, wherein said plurality of closed cells collectively comprise at least half of an interior volume of said top portion of said slat.

7. A slat for a reciprocating slat conveyor system according to claim 1, wherein said plurality of closed cells are filled with a pressurized gas.

8. A slat for a reciprocating slat conveyor system according to claim 1, wherein said top portion comprises reinforcing members.

9. A slat for a reciprocating slat conveyor system according to claim 8, wherein said reinforcing members comprise longitudinally extending reinforcing fibers.

10. A slat for a reciprocating slat conveyor system according to claim 8, wherein said reinforcing members comprise at least one of z-axis reinforcing fibers and y-axis fibers.

11. A slat for a reciprocating slat conveyor system according to claim 8, wherein said reinforcing members comprise at least one of a continuous z-stitch or a discontinuous z-stitch.

12. A slat for a reciprocating slat conveyor system according to claim 1, further comprising a guide block configured for lengthwise insertion and sliding movement within said open cell, said guide block disposed on top of a cross-member.

13. A slat for a reciprocating slat conveyor system according to claim 12, wherein a width of said guide block is substantially equal to a width of said cross-member along a direction perpendicular to a direction of reciprocating movement of a slat.

14. A reciprocating slat conveyor system having a plurality of adjacent conveyor slats mounted to be selectively reciprocated endwise, comprising:

a plurality of elongated slat bodies extending in and reciprocatingly moving in a first direction, said elongated slat bodies including a top portion, a first side portion, and a second side portion, said first and second side portions depending downwardly from opposite lengthwise sides of said top portion, wherein said first side portion and second side portion each include projections extending toward an opposing side portion, wherein said top portion of said slat body comprises a plurality of closed cells spaced apart along a width of said top portion, wherein said plurality of closed cells are at least substantially hollow, and wherein a bottom of said top portion, said first side portion, said second side portion, and said projections comprise an open cell;

a plurality of guide blocks mounted to a top surface of cross members extending in a second direction perpendicular to said first direction.

15. A reciprocating slat conveyor system according to claim 14, wherein said guide blocks extend in a first direction to cover a respective portion of a cross member.

16. A reciprocating slat conveyor system according to claim 15, wherein said guide blocks are attached to a cross member by a mechanical fastener.

17. A reciprocating slat conveyor system according to claim 15, further comprising a drive system.

18. A slat for a reciprocating slat conveyor system according to claim 14, wherein said plurality of guide blocks each comprise a base portion, said base portion being attached to a cross member extending in a second direction perpendicular to said first direction, wherein said first side portion and said second side portion projections are slidingly disposed on said guide block base portion, and wherein said slats are supported by said first side portion and said second side portion projections.

19. A slat for a reciprocating slat conveyor system according to claim 18, wherein said slats are supported only by said first side portion and said second side portion projections.

* * * * *